United States Patent
Boyd et al.

(10) Patent No.: US 7,571,273 B2
(45) Date of Patent: Aug. 4, 2009

(54) BUS/DEVICE/FUNCTION TRANSLATION WITHIN AND ROUTING OF COMMUNICATIONS PACKETS IN A PCI SWITCHED-FABRIC IN A MULTI-HOST ENVIRONMENT UTILIZING MULTIPLE ROOT SWITCHES

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 11/567,425

(22) Filed: Dec. 6, 2006

(65) Prior Publication Data

US 2008/0137677 A1    Jun. 12, 2008

(51) Int. Cl.
    *G06F 13/00*    (2006.01)
(52) U.S. Cl. .................. 710/316; 710/306; 710/312
(58) Field of Classification Search ................. 710/305, 710/306, 311, 312, 313, 316, 317; 709/220
    See application file for complete search history.

(56) References Cited

U.S. PATENT DOCUMENTS

| 5,257,353 | A | 10/1993 | Blanck et al. |
|---|---|---|---|
| 5,367,695 | A | 11/1994 | Narad et al. |
| 5,392,328 | A | 2/1995 | Schmidt et al. |
| 5,960,213 | A | 9/1999 | Wilson |
| 5,968,189 | A | 10/1999 | Desonyers et al. |
| 6,061,753 | A | 5/2000 | Ericson |
| 6,247,057 | B1 * | 6/2001 | Barrera, III ............. 709/229 |
| 6,662,251 | B2 | 12/2003 | Brock et al. |
| 6,691,184 | B2 | 2/2004 | Odenwald et al. |

(Continued)

FOREIGN PATENT DOCUMENTS

WO    2006089914 A1    8/2006

OTHER PUBLICATIONS

PCI Express Technology, Dell, Feb. 2004.*

(Continued)

*Primary Examiner*—Khanh Dang
(74) *Attorney, Agent, or Firm*—Yee & Associates, P.C.; Libby Z. Handelsman

(57) ABSTRACT

A computer-implemented method, apparatus, and computer program product are disclosed for bus/device/function (BDF) translation and routing of communications packets through a fabric that utilizes PCI switches. Identifiers are included in communications packets that are routed between a host and an I/O adapter using a PCI fabric to which the host and the I/O adapter are coupled. Destination identifiers that are included in first communications packets that are received by edge switches, which are connected directly to said host or directly connected to said I/O adapter, are translated before routing the communications packets out of the edge switches. Second communications packets that are received by internal switches, which are not directly connected to the host or directly connected to the I/O adapter, are routed without translating destination identifiers that are included in the second communications packets.

20 Claims, 8 Drawing Sheets

U.S. PATENT DOCUMENTS

| | | |
|---|---|---|
| 6,769,021 B1 | 7/2004 | Bradley et al. |
| 6,775,750 B2 | 8/2004 | Krueger |
| 6,813,653 B2 | 11/2004 | Avery |
| 6,907,510 B2 | 6/2005 | Bennett et al. |
| 7,036,122 B2 | 4/2006 | Bennett et al. |
| 7,096,305 B2 | 8/2006 | Moll |
| 7,103,064 B2 | 9/2006 | Petty et al. |
| 7,134,052 B2 | 11/2006 | Bailey et al. |
| 7,174,413 B2 | 2/2007 | Pettey et al. |
| 7,188,209 B2 | 3/2007 | Pettey et al. |
| 7,194,538 B1 | 3/2007 | Rabe et al. |
| 7,308,503 B2 * | 12/2007 | Giraud et al. ............... 709/230 |
| 7,356,636 B2 * | 4/2008 | Torudbakken et al. ....... 710/313 |
| 7,362,702 B2 * | 4/2008 | Terrell et al. ................ 370/230 |
| 7,363,389 B2 | 4/2008 | Collins et al. |
| 7,363,404 B2 * | 4/2008 | Boyd et al. ................. 710/104 |
| 7,380,046 B2 * | 5/2008 | Boyd et al. ................. 710/316 |
| 7,398,337 B2 | 7/2008 | Arndt et al. |
| 2002/0144001 A1 | 10/2002 | Collins et al. |
| 2002/0161937 A1 | 10/2002 | Odenwald et al. |
| 2002/0188701 A1 | 12/2002 | Brown et al. |
| 2003/0221030 A1 | 11/2003 | Pontius et al. |
| 2004/0015622 A1 | 1/2004 | Avery |
| 2004/0025166 A1 | 2/2004 | Adlung et al. |
| 2004/0039986 A1 | 2/2004 | Solomon et al. |
| 2004/0123014 A1 | 6/2004 | Schaefer et al. |
| 2004/0172494 A1 | 9/2004 | Pettey et al. |
| 2004/0179534 A1 | 9/2004 | Pettey et al. |
| 2004/0193677 A1 * | 9/2004 | Dar et al. .................... 709/203 |
| 2004/0210754 A1 | 10/2004 | Barron et al. |
| 2004/0230709 A1 | 11/2004 | Moll |
| 2004/0230735 A1 | 11/2004 | Moll |
| 2005/0025119 A1 | 2/2005 | Pettey et al. |
| 2005/0044301 A1 | 2/2005 | Vasilevsky et al. |
| 2005/0102682 A1 | 5/2005 | Shah et al. |
| 2005/0147117 A1 | 7/2005 | Pettey et al. |
| 2005/0188116 A1 | 8/2005 | Brown et al. |
| 2005/0228531 A1 | 10/2005 | Genovker et al. |
| 2005/0270988 A1 | 12/2005 | DeHaemer |
| 2006/0168361 A1 | 7/2006 | Brown et al. |
| 2006/0174094 A1 | 8/2006 | Lloyd et al. |
| 2006/0179195 A1 | 8/2006 | Sharma et al. |
| 2006/0179238 A1 | 8/2006 | Griswell et al. |
| 2006/0179239 A1 | 8/2006 | Frey et al. |
| 2006/0179265 A1 | 8/2006 | Flood et al. |
| 2006/0179266 A1 | 8/2006 | Flood et al. |
| 2006/0184711 A1 | 8/2006 | Pettey et al. |
| 2006/0184767 A1 | 8/2006 | Le et al. |
| 2006/0184768 A1 | 8/2006 | Bishop et al. |
| 2006/0184769 A1 | 8/2006 | Floyd et al. |
| 2006/0184770 A1 | 8/2006 | Bishop et al. |
| 2006/0184946 A1 | 8/2006 | Bishop et al. |
| 2006/0195617 A1 | 8/2006 | Arndt et al. |
| 2006/0195619 A1 | 8/2006 | Arndt et al. |
| 2006/0195634 A1 | 8/2006 | Arndt et al. |
| 2006/0195642 A1 | 8/2006 | Arndt et al. |
| 2006/0195644 A1 | 8/2006 | Arndt et al. |
| 2006/0195663 A1 | 8/2006 | Arndt et al. |
| 2006/0195673 A1 | 8/2006 | Arndt et al. |
| 2006/0195675 A1 | 8/2006 | Arndt et al. |
| 2006/0195848 A1 | 8/2006 | Arndt et al. |
| 2006/0206655 A1 | 9/2006 | Chappell et al. |
| 2006/0206936 A1 | 9/2006 | Liang et al. |
| 2006/0209863 A1 | 9/2006 | Arndt et al. |
| 2006/0212608 A1 | 9/2006 | Arndt et al. |
| 2006/0212620 A1 | 9/2006 | Arndt et al. |
| 2006/0212870 A1 | 9/2006 | Arndt et al. |
| 2006/0224790 A1 | 10/2006 | Arndt et al. |
| 2006/0230181 A1 | 10/2006 | Riley |
| 2006/0230217 A1 | 10/2006 | Moll |
| 2006/0239287 A1 | 10/2006 | Johnsen et al. |
| 2006/0242333 A1 | 10/2006 | Johnsen et al. |
| 2006/0242352 A1 | 10/2006 | Torudbakken et al. |
| 2006/0242354 A1 | 10/2006 | Johnsen et al. |
| 2006/0253619 A1 | 11/2006 | Torudbakken et al. |
| 2007/0027952 A1 | 2/2007 | Boyd et al. |
| 2007/0097949 A1 * | 5/2007 | Boyd et al. .................. 370/351 |
| 2007/0097950 A1 * | 5/2007 | Boyd et al. .................. 370/351 |
| 2007/0183393 A1 * | 8/2007 | Boyd et al. .................. 370/351 |
| 2008/0052443 A1 * | 2/2008 | Cassiday et al. ............ 710/316 |

OTHER PUBLICATIONS

U.S. Appl. No. 11/140,648, filed May 27, 2005, Mack et al.
U.S. Appl. No. 11/260,610, filed Oct. 27, 2005, Boyd et al.
U.S. Appl. No. 11/260,618, filed Oct. 27, 2005, Boyd et al.
U.S. Appl. No. 11/260,619, filed Oct. 27, 2005, Boyd et al.
U.S. Appl. No. 11/191,626, filed Jul. 28, 2005, Boyd et al.
U.S. Appl. No. 11/260,624, filed Oct. 27, 2005, Boyd et al.
U.S. Appl. No. 11/176,922, filed Jul. 7, 2005, Boyd et al.
U.S. Appl. No. 11/340,447, filed Jan. 26, 2006, Boyd et al.
U.S. Appl. No. 11/334,678, filed Jan. 18, 2006, Boyd et al.
U.S. Appl. No. 11/260,621, filed Oct. 27, 2005, Boyd et al.
U.S. Appl. No. 11/348,903, filed Feb. 7, 2006, Boyd et al.
U.S. Appl. No. 11/301,109, filed Dec. 12, 2005, Boyd et al.
U.S. Appl. No. 11/351,202, filed Feb. 9, 2006, Boyd et al.

* cited by examiner

FIG. 5

| SOURCE NAME | DESTINATION NAME | SOURCE PORT | SOURCE BDF | DESTINATION BDF | STATE | DESTINATION PORT | TRANSLATED SOURCE BDF | TRANSLATED DESTINATION BDF |
|---|---|---|---|---|---|---|---|---|
| B SI 3 | IOA2F0 | 332 | 0.0.1 | 0.1.1 | X-late | 334 | 1.1.1 | 6.1.1 |
| IOA2F0 | B SI 3 | 334 | 6.1.1 | 1.1.1 | X-late | 332 | 0.1.1 | 0.0.1 |
| A SI 2 | IOA3F0 | 334 | 0.1.2 | 7.1.1 | Route | 335 | 0.1.2 | 7.1.1 |
| IOA3F0 | A SI 2 | 335 | 7.1.1 | 0.1.2 | Route | 334 | 7.1.1 | 0.1.2 |
| C SI 4 | IOA2F1 | 335 | 2.1.1 | 6.1.2 | Route | 334 | 2.1.1 | 6.1.2 |
| IOA2F1 | C SI 4 | 334 | 6.1.2 | 2.1.1 | Route | 335 | 6.1.2 | 2.1.1 |
| C SI 5 | IOA2F3 | 335 | 2.1.2 | 6.1.3 | Route | 334 | 2.1.2 | 6.1.3 |
| IOA2F3 | C SI 5 | 334 | 6.1.3 | 2.1.2 | Route | 335 | 6.1.3 | 2.1.2 |

BDF TABLE 357

BDF TABLE 390

| SOURCE NAME | DESTINATION NAME | SOURCE PORT | SOURCE BDF | DESTINATION BDF | STATE | DESTINATION PORT | TRANSLATED SOURCE BDF | TRANSLATED DESTINATION BDF |
|---|---|---|---|---|---|---|---|---|
| A SI 1 | IOA1F0 | 331 | 0.0.1 | 0.1.1 | X-late | 360 | 0.0.1 | 0.1.1 |
| IOA1F0 | A SI 1 | 360 | 0.1.1 | 0.0.1 | X-late | 331 | 0.1.1 | 0.0.1 |
| A SI 2 | IOA1F1 | 331 | 0.0.2 | 0.1.1 | X-late | 360 | 0.0.2 | 0.1.2 |
| IOA1F1 | A SI 2 | 360 | 0.1.2 | 0.0.2 | X-late | 331 | 0.1.1 | 0.0.2 |
| A SI 2 | IOA3F0 | 331 | 0.0.2 | 0.1.2 | X-late | 358 | 0.1.2 | 7.1.1 |
| IOA3F0 | A SI 2 | 358 | 7.1.1 | 0.1.2 | X-late | 331 | 0.1.2 | 0.0.2 |
| B SI 3 | IOA2F0 | 358 | 1.1.1 | 6.1.1 | X-late | 361 | 0.0.1 | 0.1.1 |
| IOA2F0 | B SI 3 | 361 | 0.1.1 | 0.0.1 | X-late | 358 | 6.1.1 | 1.1.1 |
| C SI 4 | IOA2F1 | 358 | 2.1.1 | 6.1.2 | X-late | 361 | 6.1.2 | 0.1.2 |
| IOA2F1 | C SI 4 | 361 | 0.1.2 | 2.1.1 | X-late | 358 | 6.1.2 | 2.1.1 |
| C SI 5 | IOA2F3 | 358 | 2.1.2 | 6.1.3 | X-late | 361 | 2.1.2 | 0.1.3 |
| IOA2F3 | C SI 5 | 361 | 0.1.3 | 2.1.2 | X-late | 358 | 6.1.3 | 2.1.2 |

FIG. 7

BDF TABLE 392

| SOURCE NAME | DESTINATION NAME | SOURCE PORT | SOURCE BDF | DESTINATION BDF | STATE | DESTINATION PORT | TRANSLATED SOURCE BDF | TRANSLATED DESTINATION BDF |
|---|---|---|---|---|---|---|---|---|
| A SI 2 | IOA3F0 | 359 | 0.1.2 | 7.1.1 | X-late | 362 | 0.0.2 | 0.1.1 |
| IOA3F0 | A SI 2 | 362 | 0.1.1 | 0.0.2 | X-late | 359 | 7.1.1 | 0.1.2 |
| C SI 4 | IOA2F1 | 333 | 0.0.1 | 0.1.1 | X-late | 359 | 2.1.2 | 6.1.2 |
| IOA2F1 | C SI 4 | 359 | 6.1.2 | 2.1.1 | X-late | 333 | 0.1.1 | 0.0.1 |
| C SI 4 | IOA3F1 | 333 | 0.0.1 | 0.1.2 | X-late | 362 | 0.0.1 | 0.1.2 |
| IOA3F1 | C SI 4 | 362 | 0.1.2 | 0.0.1 | X-late | 333 | 0.1.2 | 0.0.1 |
| C SI 5 | IOA2F3 | 333 | 0.0.2 | 2.1.2 | X-late | 359 | 2.1.2 | 6.1.3 |
| IOA2F3 | C SI 5 | 359 | 6.1.3 | 0.1.2 | X-late | 333 | 0.1.1 | 0.0.2 |
| C SI 5 | IOA4F0 | 333 | 0.0.2 | 0.1.2 | X-late | 363 | 0.0.1 | 0.1.1 |
| IOA4F0 | C SI 5 | 363 | 0.1.1 | 0.0.1 | X-late | 333 | 0.1.2 | 0.0.2 |

700 → SOURCE NAME / DESTINATION NAME · 702 SOURCE PORT · 704 SOURCE BDF · 706 DESTINATION BDF · 708 STATE · 710 DESTINATION PORT · 712 TRANSLATED SOURCE BDF · 714 TRANSLATED DESTINATION BDF · 716 · 718

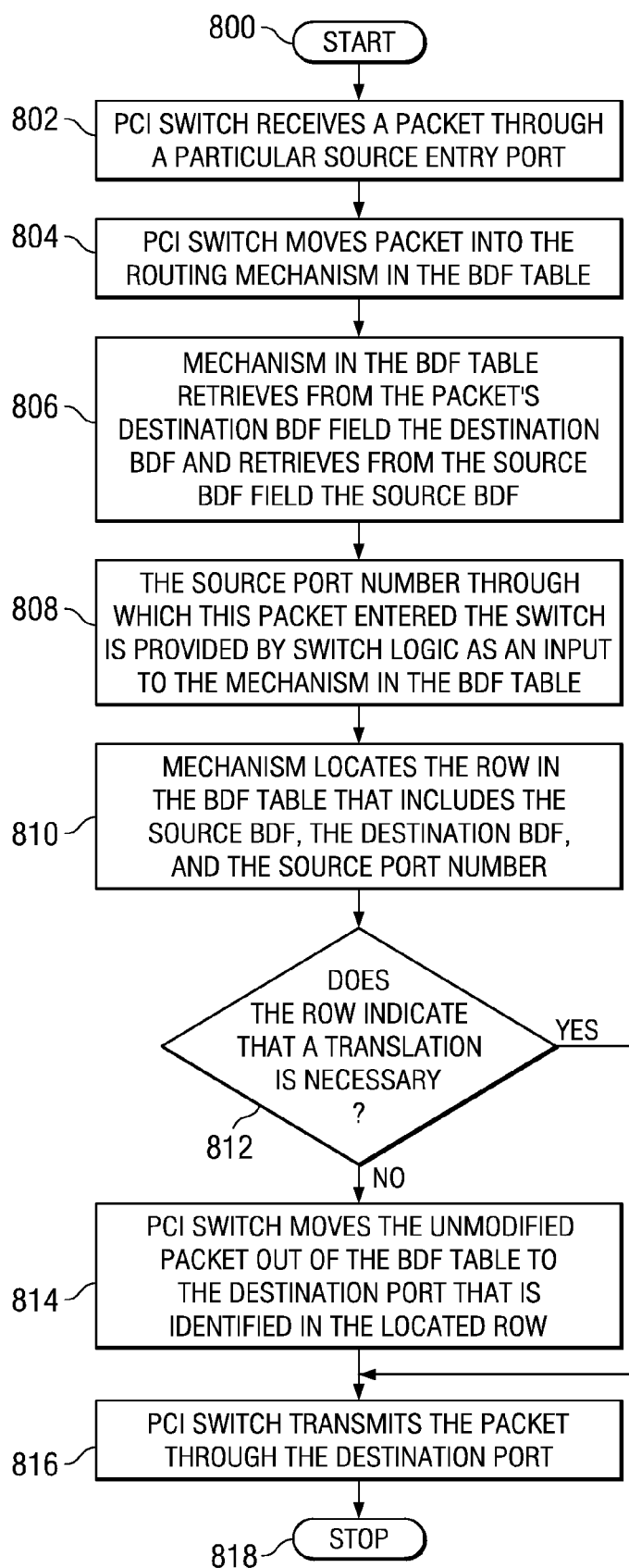
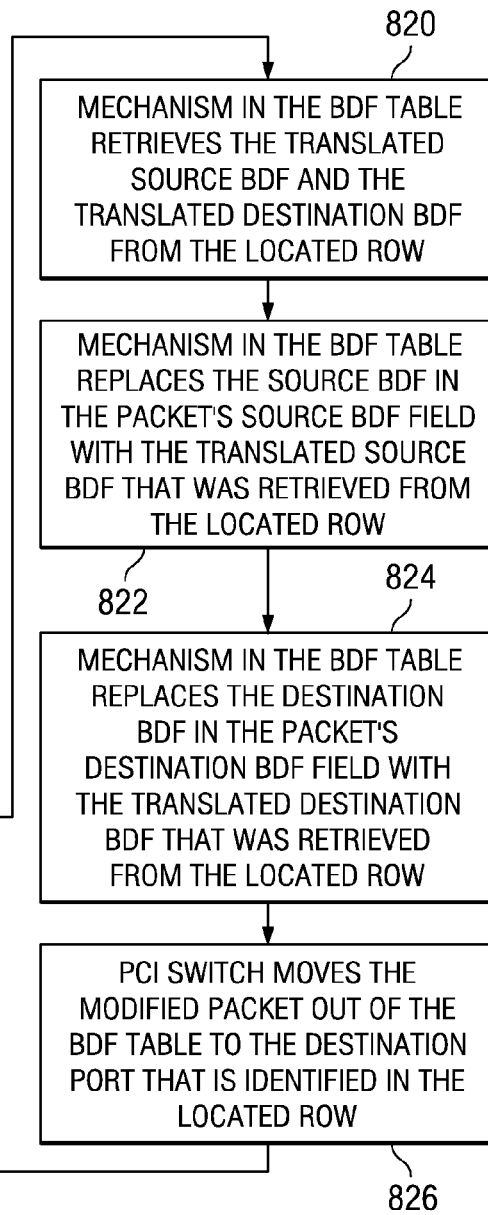
FIG. 8

BUS/DEVICE/FUNCTION TRANSLATION WITHIN AND ROUTING OF COMMUNICATIONS PACKETS IN A PCI SWITCHED-FABRIC IN A MULTI-HOST ENVIRONMENT UTILIZING MULTIPLE ROOT SWITCHES

BACKGROUND OF THE INVENTION

1. Field of the Invention

The present invention relates generally to data processing systems and more particularly to communications in a data processing system including multiple host computer systems and one or more adapters where the host computer systems share the adapter(s) and communicate with those adapter(s) through a PCI switched-fabric bus. Still more specifically, the present invention relates to a computer-implemented method, apparatus, and computer program product for translating bus/device/function numbers and routing communications packets that include those numbers through a PCI switched-fabric that utilizes PCI switches to enable multiple host computer systems to share one or more adapters.

2. Description of the Related Art

A conventional PCI bus is a local parallel bus that permits expansion cards to be installed within a single computer system, such as a server or a personal computer. PCI-compliant adapter cards can then be coupled to the PCI bus in order to add input/output (I/O) devices, such as disk drives, network adapters, or other devices, to the computer system. A PCI bridge/controller is needed in order to connect the PCI bus to the system bus of the computer system. The adapters on the PCI bus can communicate through the PCI bridge/controller with the CPU of the computer system in which the PCI bus is installed. Several PCI bridges may exist within a single computer system. However, these PCI bridges serve to couple multiple PCI buses to the CPU of the computer system in which the PCI buses are installed. If the single computer system includes multiple CPUs, the PCI buses can be utilized by the multiple CPUs of the single computer system.

A PCI Express (PCIe) bus is a recent version of the standard PCI computer bus. PCIe is based on higher speed serial communications. PCIe is architected specifically with a tree-structured I/O interconnect topology in mind with a Root Complex (RC) denoting the root of an I/O hierarchy that connects a host computer system to the I/O.

PCIe provides a migration path compatible with the PCI software environment. In addition to offering superior bandwidth, performance, and scalability in both bus width and bus frequency, PCI Express offers other advanced features. These features include QoS (quality of service), aggressive power management, native hot-plug, bandwidth per pin efficiency, error reporting, recovery and correction and innovative form factors, peer-to-peer transfers and dynamic reconfiguration. PCI Express also enables low-cost design of products via low pin counts and wires. A 16-lane PCI Express interconnect can provide data transfer rates of 8 Gigabytes per second.

The host computer system typically has a PCI-to-Host bridging function commonly known as the root complex. The root complex bridges between a CPU bus, such as Hyper-Transport™, or the CPU front side bus (FSB) and the PCI bus. Multiple host computer systems containing one or more root functions are referred to as a multi-root system. Multi-root configurations which share I/O fabrics have not been addressed well in the past.

Today, PCIe buses do not permit sharing of PCI adapters among multiple separate computer systems. Known I/O adapters that comply with the PCIe standard or a secondary network standard, such as Fibre Channel, InfiniBand, or Ethernet, are typically integrated into blades and server computer systems and are dedicated to the blade or system in which they are integrated. Having dedicated adapters adds to the cost of each system because an adapter is expensive. In addition to the cost issue, there are physical space concerns in a blade system. There is little space available in a blade for one adapter, and generally no simple way to add more than one.

Being able to share adapters among a number of host computers would lower the connectivity cost per host, since each adapter is servicing the I/O requirements of a number of hosts, rather than just one. Being able to share adapters among multiple hosts can also provide additional I/O expansion and flexibility options. Each host could access the I/O through any number of the adapters collectively available. Rather than being limited by the I/O slots in the host system, the I/O connectivity options include the use of adapters installed in any of the host systems connected through the shared bus.

In known systems, the PCIe bus provides a communications path between a single host and the adapter(s). Read and write accesses to the I/O adapters are converted in the root complex to packets that are transmitted from the host computer system, or a system image that is included within that host computer system, through the PCIe fabric to an intended adapter that is assigned to that host or system image. The PCIe standard defines a bus/device/function (BDF) number (B=PCI Bus segment number, D=PCI Device number on that bus, and F=Function number on that specific device) that can be used to identify a particular function within a device, such as an I/O adapter. The host computer system's root complex is responsible for assigning a BDF number to the host and each function within each I/O adapter that is associated with the host.

The BDF number includes three parts for traversing the PCI fabric: the PCI bus number where the I/O adapter is located, the device number of the I/O adapter on that bus, and the function number of the specific function, within that I/O adapter, that is being utilized.

A host may include multiple different system images, or operating system images. A system image is an instance of a general purpose operating system, such as WINDOWS® or LINUX®, or a special purpose operating system, such as an embedded operating system used by a network file system device. When a host includes more than one system image, each system image is treated as a different function within the single device, i.e., the host.

Each communications packet includes a source address field and a destination address field. These are memory addresses that are within the range of addresses allocated to the specific end points. These address ranges correlate to specific source BDF and destination BDF values.

Each packet transmitted by a host includes a destination address which corresponds to the mapped address range of the intended adapter. This destination address is used by the host's root complex to identify the correct output port for this specific packet. The root complex then transmits this packet out of the identified port.

The host is coupled to the I/O adapters using a fabric. One or more switches are included in the fabric. The switches route packets through the fabric to their intended destinations. Switches in the fabric examine the host-assigned adapter BDF to determine if the packet must be routed through the switch, and if so, through which output switch port.

According to the PCIe standard, the root complex within a host assigns BDF numbers for the host and for the adapters. The prior art assumes that only one host is coupled to the fabric. When only one host is coupled to the fabric, there can be no overlap of BDF numbers the root complex assigns since the single root complex is responsible for assigning all BDF numbers. If there is no overlap, switches are able to properly route packets to their intended destinations.

A root complex follows a defined process for assigning BDF numbers. The root complex assigns a BDF number of 0.0.1 to a first system image, a BDF number of 0.0.2 to a second system image, and so on.

Physical I/O adapters are typically virtualized such that a physical I/O adapter appears as multiple separate virtual I/O adapters. Each one of these virtual adapters is a separate function.

Each virtual I/O adapter is associated with a system image. One physical I/O adapter can be virtualized into virtual I/O adapters that are each associated with different system images. For example, if the host includes three system images, a physical I/O adapter can be virtualized into three virtual I/O adapters where each virtual I/O adapter is associated with a different system image. Further, a system could include several physical I/O adapters, each including one or more virtual adapters. The virtual I/O adapters would then be associated with the different system images of the single host. For example, a first physical I/O adapter might include a first virtual I/O adapter that is associated with a first system image of the host and a second virtual I/O adapter that is associated with a second system image of the host. A second physical adapter might include only a single virtual I/O adapter that is associated with a third system image of the host. A third physical adapter might include two virtual adapters, the first associated with the second system image and the second associated with the third system image.

If multiple hosts are simultaneously coupled to the fabric, there will be overlap of the BDF numbers that are selected by the root complexes of the hosts. Overlap occurs because each host will assign a BDF number of 0.0.1 to itself. Thus, a BDF that should identify only one function included in only one host will not uniquely identify just one function in just one host.

The root complex assigns a BDF number of 1.1.1 to the first function within a first adapter that the root complex sees on a first bus. This process continues until all BDF numbers are assigned.

Unique memory address ranges are assigned to each device as needed for that device to operate. These address ranges correspond to the assigned BDF numbers, but only the root complex maintains a table of the corresponding values, which it uses to route packets.

If multiple hosts are coupled to the fabric, each host's root complex will assign a BDF number of 1.1.1 to the first function within a first adapter that a root complex sees on a first bus. This results in the BDF number 1.1.1 being assigned to multiple different functions. Therefore, there is overlap of BDF numbers that would be used by the multiple hosts. In a similar fashion, the memory address ranges assigned on each host for its devices will overlap with the memory address ranges assigned on other hosts to their devices. When the BDF numbers and memory address ranges overlap, switches are unable to properly route packets.

Therefore, a need exists for a method, apparatus, and computer program product for address translation and routing of communications packets through a fabric that includes one or more host systems, each of which having one or more system images, communicating with one or more physical adapters, each of which providing one or more virtual adapters, through a fabric of interconnected multi-root switches.

SUMMARY OF THE INVENTION

The preferred embodiment of the present invention is a computer-implemented method, apparatus, and computer program product for translation of addresses and improved routing of communications packets through a PCI switched-fabric that utilizes multiple PCI root switches.

A computer-implemented method, apparatus, and computer program product are disclosed for translating BDF addresses and routing communications packets through the fabric. A data processing environment includes host computer systems that are coupled to adapters using a PCI bus or multiple PCI bus segments interconnected with PCI switches into a single PCI fabric. The fabric includes a mechanism that receives a communications packet, from one of the host computer systems, that is intended to be delivered to a particular function that is provided by one of the adapters.

A translation is done in the switch that is directly connected to the host and then again in the switch that is directly connected to the intended adapter. All other switches in the fabric that receive this packet will forward the packet without translating any address numbers.

When the switch receives a packet through a source port, the switch identifies this source port to a translation mechanism that is included in the switch. The switch moves the packet into the mechanism. The mechanism retrieves the source address and destination address from the packet, which each contain an encoded version of the source BDF number and the destination BDF number. The mechanism identifies a particular row in its BDF table using the source port, source BDF, and destination BDF.

The mechanism then analyzes the state field in the identified row. If the state field indicates that the packet should just be routed (without performing a translation), the switch moves the packet out of the mechanism and then transmits the packet out of the destination port that is indicated by the identified row. This packet is routed using the destination BDF.

If the state field indicates that the BDF numbers in the packet should be translated, the mechanism replaces the source BDF number, which is currently stored in the packet's source BDF field, with the BDF number that is stored in the translated source BDF field in the identified row. The mechanism also replaces the destination BDF number, which is currently stored in the packet's destination BDF field, with the BDF number that is stored in the translated destination BDF field in the identified row. The switch moves the packet out of the mechanism and then transmits the packet out of the destination port that is indicated by the identified row. This packet is routed using the destination BDF, which in this case is the translated destination BDF.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a block diagram of a first BDF translation table in accordance with the illustrative embodiment;

FIG. 6 is a block diagram of a second BDF translation table in accordance with the illustrative embodiment;

FIG. 7 is a block diagram of a third BDF translation table in accordance with the illustrative embodiment; and FIG. 8 illustrates a high level flow chart that depicts translating identifiers that are used to route packets between a source device and a destination device in accordance with the illustrative embodiment.

DETAILED DESCRIPTION OF THE PREFERRED EMBODIMENT

Figure 1:
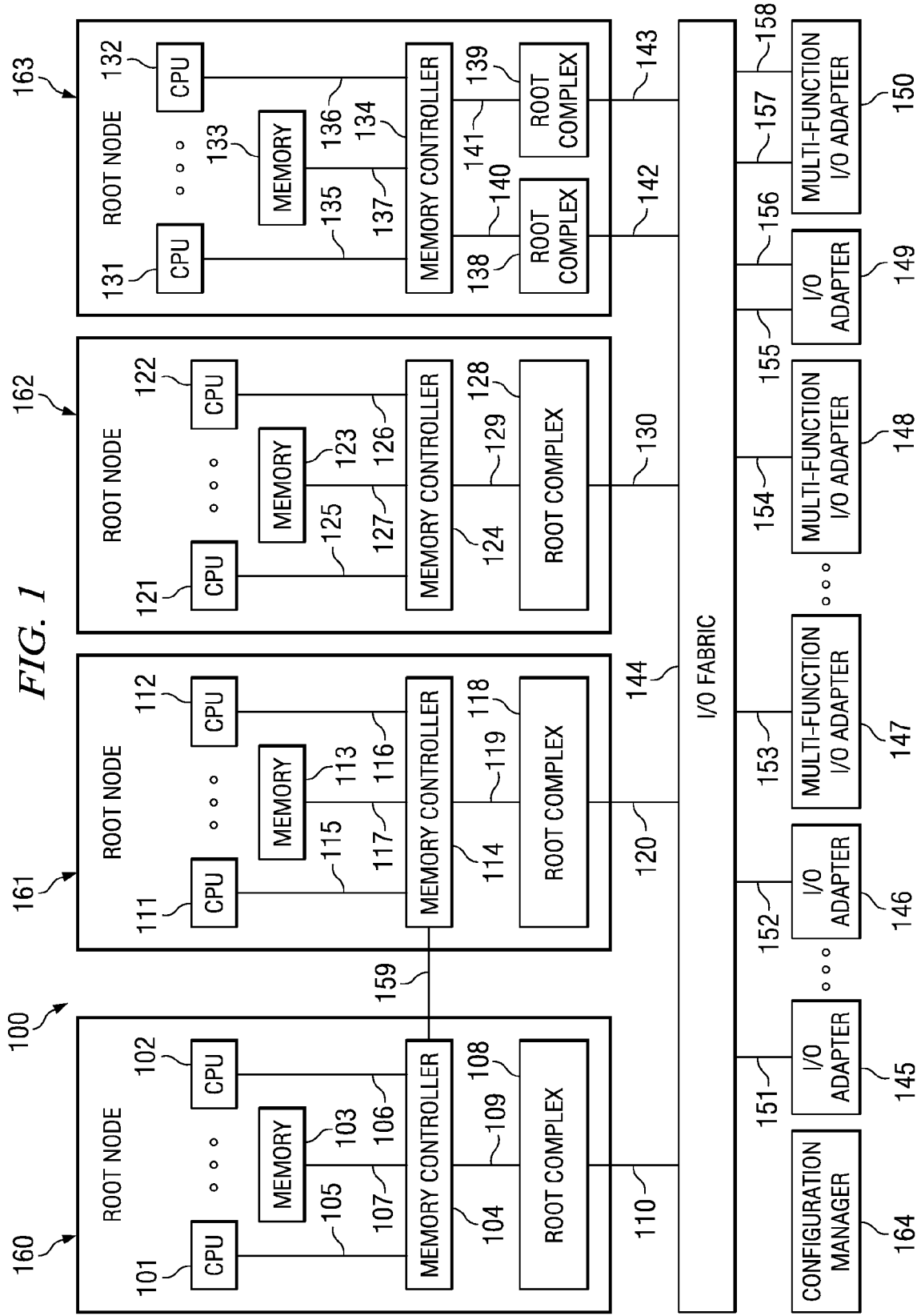
FIG. 1 is a diagram of a distributed computer system in accordance with the illustrative embodiment.

The illustrative embodiment can be implemented in any general or special purpose computing system where multiple host computer systems share a pool of I/O adapters (IOAs) through a common I/O fabric. In the illustrative embodiment, the fabric is a collection of devices that conform to the PCI Express standard.

In the illustrative embodiment, the I/O fabric is attached to more than one host computer system such that multiple different host computer systems can share the I/O adapters, which are also attached to the fabric, with other host computer systems. The adapters may be either physical adapters that provide a single function, or physical adapters that have been divided into multiple functions, where each one of the functions is represented as a virtual adapter. Preferably, each physical adapter, function, or virtual adapter has been allocated to one and only one particular host computer system.

Host computer systems access each fabric device and/or adapter that it is authorized to access using a host-assigned BDF number. The host-assigned BDF numbers that are assigned by a host are unique within the scope of that particular host. Thus, there is no duplication within a particular host of any host-assigned BDF numbers. Since each host assigns its own BDF numbers, however, the same BDF numbers may be assigned by other hosts to the adapters that they are authorized to use. Although host-assigned BDF numbers are unique within a particular host, they may not be unique across all hosts or across the entire fabric.

When a host transmits a packet to one of its assigned adapters, the host inserts its host-assigned adapter BDF number of the intended adapter into the destination address field that is included in the packet. The host places the host's own host-assigned host BDF number into the source address field that is included in the packet.

According to the illustrative embodiment, a translation mechanism (the BDF table) is included within each switch in the system's fabric. The BDF table is preferably a hardware device. The BDF table is used to enable or disable access from each host to each device, simplify routing of communications between hosts and devices, and to protect the address space of one host from another host.

The BDF table includes information that is used to determine whether the source and destination BDF numbers that are included in the packet need to be translated. Further, the BDF table includes the translated source and destination BDF numbers that are used in case a translation is necessary.

Each packet includes a source BDF field and a destination BDF field. A source BDF is included in the source BDF field and a destination BDF is included in the destination BDF field.

When a packet is received by a PCI switch through one of its source ports, the PCI switch moves the packet into the BDF table. A mechanism within the BDF table uses the identity of the source port, the source BDF, and destination BDF to identify one of the rows in the BDF table. The mechanism then analyzes a translation field in the identified row to determine whether the source and destination BDFs need to be translated. The translation field indicates either "translate" or "route".

When the field indicates "route", the switch moves the packet out of the mechanism and transmits the packet through the packet's destination port that is indicated by the identified row.

When the field indicates "translate", the mechanism modifies the packet by replacing the original source BDF with the translated source BDF that is indicated by the identified row, and by replacing the original destination BDF with the translated destination BDF that is indicated by the identified row.

With reference now to the figures and in particular with reference to FIG. 1, a diagram of a distributed computing system environment 100 is illustrated in accordance with the illustrative embodiment. The distributed computer system represented in FIG. 1 takes the form of two or more root complexes (RCs) 108, 118, 128, 138, and 139, attached to an I/O fabric 144 through I/O links 110, 120, 130, 142, and 143, and to the memory controllers 104, 114, 124, and 134 of the root nodes (RNs) 160-163.

A root complex is included within a host in a root node. The host computer system typically has a PCI-to-Host bridging function commonly known as the root complex. The root complex bridges between a CPU's Front Side Bus (FSB), or another CPU bus, such as hyper-transport, and the PCI bus. A multi-root system is a system that includes two or more hosts, such that two or more root complexes are included. A root node is a complete computer system, such as a server computer system. A root node is also referred to herein as a host node.

In other embodiments, a root node may have a more complex attachment to the fabric through multiple bridges, or connections to multiple points in the fabric. Or, a root node may have external means of coordinating the use of shared adapters with other root nodes. But, in all cases, the BDF table described in this invention is located between the host system(s) and the adapter(s), so that it can intervene on all communications between hosts and adapters. The BDF table will treat each host-function pair as a single connection, with just one entry port and just one exit port in the root switch.

The I/O fabric is attached to the IOAs 145-150 through links 151-158. The IOAs may be single function IOAs as in 145-146 and 149, or multiple function IOAs as in 147-148 and 150. Further, the IOAs may be connected to the I/O fabric via single links as in 145-148 or with multiple links for redundancy as in 149-150.

The root complexes (RCs) 108, 118, 128, 138, and 139 are part of a root node (RN) 160-163. There may be more than one root complex per root node as in RN 163. In addition to the root complexes, each root node consists of one or more Central Processing Units (CPUS) or other processing elements 101-102, 111-112, 121-122, 131-132, memory 103, 113, 123, and 133, a memory controller 104, 114, 124, and 134 which connects the CPUs, memory, and I/O through the root complex and performs such functions as handling the coherency traffic for the memory.

Root nodes may be connected together, such as by connection 159, at their memory controllers to form one coherency domain which may act as a single Symmetric Multi-Processing (SMP) system, or may be independent nodes with separate coherency domains as in RNs 162-163.

Configuration manager 164 is also referred to herein as a PCI manager. Alternatively, the PCI manager 164 may be a separate entity connected to the I/O fabric 144, or may be part of one of the RNs 160-163.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
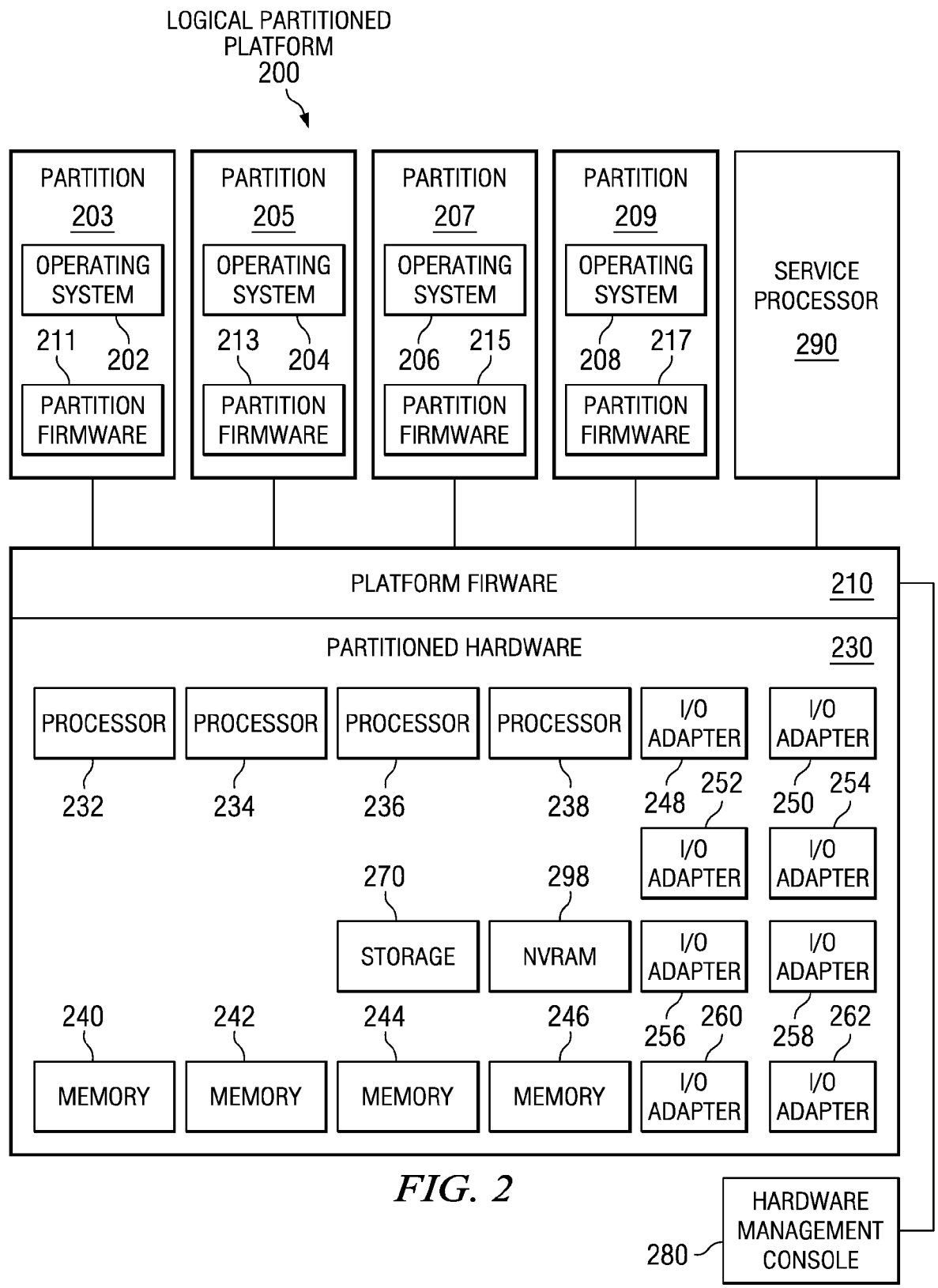
FIG. 2 is a block diagram of a logically partitioned platform in accordance with the illustrative embodiment.

FIG. 2 is a block diagram of a logically partitioned platform in accordance with the illustrative embodiment. The hardware in logically partitioned platform 200 may be implemented as, for example, distributed computing system 100 in FIG. 1. Logically partitioned platform 200 includes partitioned hardware 230, operating systems 202, 204, 206, 208, and partition firmware 210.

Operating systems 202, 204, 206, and 208 may be multiple copies of a single operating system or multiple heterogeneous operating systems simultaneously run on logically partitioned platform 200. These operating systems may be implemented using OS/400, which is designed to interface with partition management firmware, such as Hypervisor. OS/400 is used only as an example in these illustrative embodiments. Other types of operating systems, such as AIX and Linux, may also be used depending on the particular implementation.

Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation.

When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, an NVRAM storage 298, and a storage unit 270. Each of the processors 232-238, memory units 240-246, NVRAM storage 298, and IOAs 248-262, or parts thereof, may be partitioned to one of multiple partitions within logical partitioned platform 200 by being assigned to one of the partitions, each of the partitioned resources then corresponding to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate distributed computing system from which a system administrator may perform various functions including reallocation of resources to different partitions.

In a logically partitioned (LPAR) environment, it is not permissible for resources or programs in one partition to affect operations in another partition. Furthermore, to be useful, the assignment of resources needs to be fine-grained.

Figure 3:
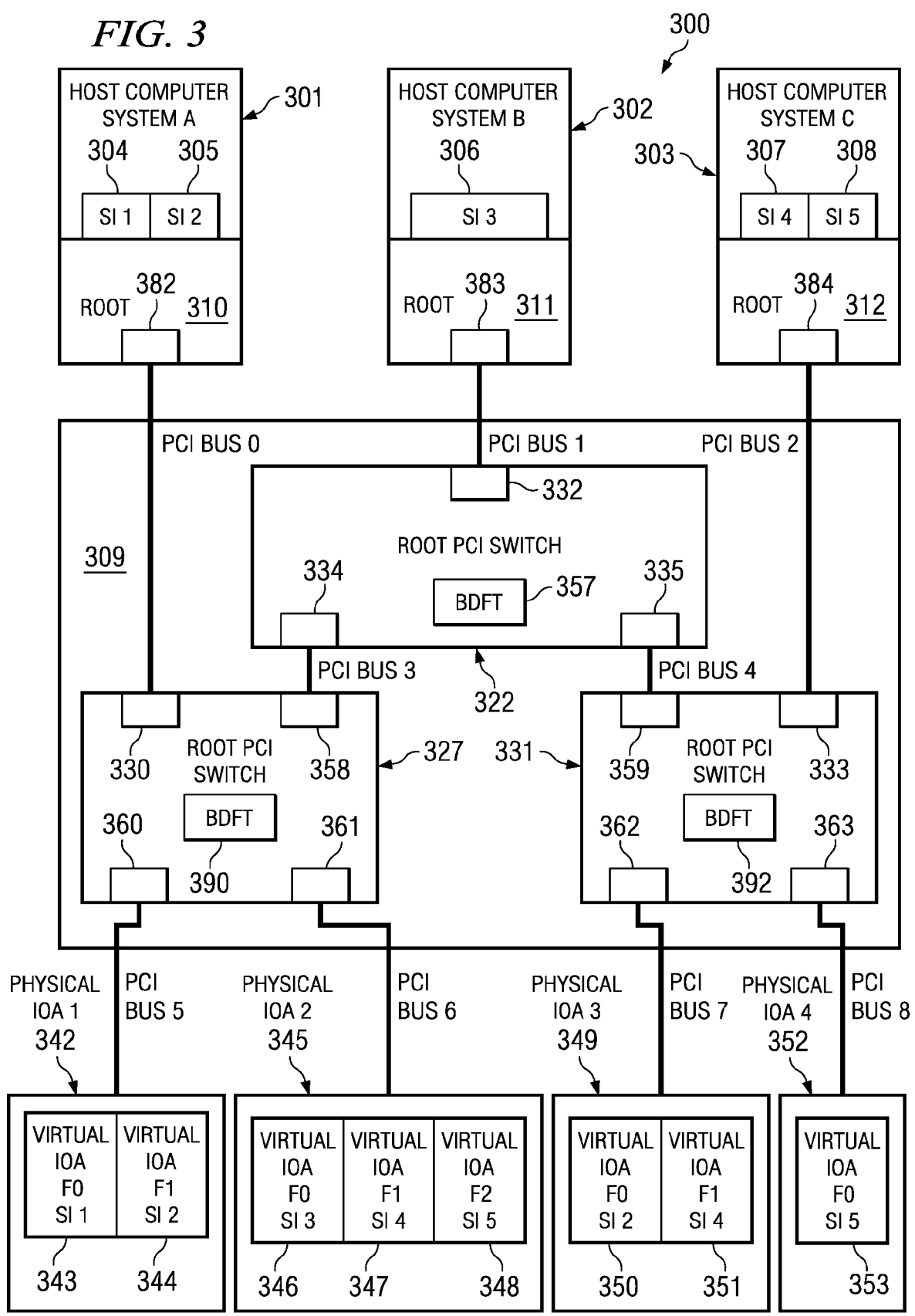
FIG. 3 is a block diagram of a data processing system, which includes a PCI switched-fabric bus (the fabric), that includes a BDF translation mechanism implemented in multiple multi-root PCI switches to which one or more of the host systems are directly connected in accordance with the illustrative embodiment.

FIG. 3 illustrates a data processing system, which includes a PCI switched-fabric bus that includes BDF number translation and routing in accordance with the illustrative embodiment. FIG. 3 depicts a PCI fabric that supports multiple root nodes through a single root PCI switch.

Data processing system 300 includes a plurality of host computer systems 301-303, each containing a single or plurality of system images (SIs) 304-308. These systems then interface to the I/O fabric 309 through their root complexes 310-312. Each of these root complexes can have one port connected to the PCI root switch. Root complex 310 is connected to port 330 of root PCI switch 327 through port 382. Root complex 311 is connected to port 332 of root PCI switch 322 through port 383. Root complex 312 is connected to port 333 of root PCI switch 331 through port 384. The connection from the root complex port to the PCI root switch port can be made with one or more physical links that are treated as a single port to port connection. A host computer system along with the corresponding root complex is referred to as a root node.

PCI switch 327 uses downstream port 360 to attach physical I/O Adapter (IOA) 1 342 to the PCI fabric via PCI bus 5. Physical adapter 1 342 has two virtual IO adapters, or virtual I/O resources, 343 and 344. Virtual adapter 343, which is function 0 (F0) of physical adapter 342, and virtual adapter 344, which is function 1 (F1) of physical adapter 342.

Similarly, PCI switch 327 uses downstream port 361 to attach physical I/O Adapter 2 345 to the PCI fabric via PCI bus 6. Physical adapter 345 has three virtual I/O adapters, or virtual IO resources, 346, 347, and 348. Virtual adapter 346, which is function 0 (F0) of physical adapter 345, virtual adapter 347, which is function 1(F1) of physical adapter 345, and virtual adapter 348, which is function 2 (F2) of physical adapter 345.

PCI switch 331 uses downstream port 362 to attach physical I/O Adapter 3 349 to the PCI fabric via PCI bus 7. Physical adapter 3 349 has two virtual I/O adapters, virtual adapter 350, which is function 0, and virtual adapter 351 which is function 1 of physical adapter 349.

PCI switch 331 uses downstream port 363 to attach a single function physical IOA 4 352 via PCI bus 8. Physical adapter 352 is shown in this example as a virtualization aware physical adapter that provides a single function, function 0 (F0), to the PCI fabric as virtual adapter 353. Alternately, a non-virtualization aware single function adapter would be attached in the same manner.

Switch 322 uses upstream port 332 to attach port 383 of root 311 via PCI bus 1. Switch 327 uses upstream port 330 to attach port 382 of root 310 via PCI bus 0. Switch 331 uses upstream port 333 to attach port 384 of root 312 via PCI bus 2.

PCI switch 327 uses upstream/downstream port 358 to attach to upstream/downstream port 358 via PCI bus 3 of switch 322. Switch 322 uses port 359 to attach to port 359 of switch 331 via PCI bus 4.

IOA 342 is shown as a virtualized IOA with its function 0 (F0) 343 assigned and accessible to system image 1 (SI1) 304, and its function 1 (F1) 344 assigned and accessible to system image 2 (SI2) 305. Thus, virtual adapter 343 is partitioned to and should be accessed only by system image 304. Virtual adapter 344 is partitioned to and should be accessed only by system image 305.

In a similar manner, IOA 345 is shown as a virtualized IOA with its function 0 (F0) 346 assigned and accessible to system image 3 (SI3) 306, its function 1 (F1) 347 assigned and accessible to system image 4 (SI4) 307, and its function 2 (F2) assigned to system image 5 (SI5) 308. Thus, virtual adapter 346 is partitioned to and should be accessed only by system image 306; virtual adapter 347 is partitioned to and should be accessed only by system image 307; virtual adapter 348 is partitioned to and should be accessed only by system image 308.

IOA 349 is shown as a virtualized IOA with its F0 350 assigned and accessible to SI2 305, and its F1 351 assigned and accessible to SI4 307. Thus, virtual adapter 350 is partitioned to and should be accessed only by system image 305; virtual adapter 351 is partitioned to and should be accessed only by system image 307.

Physical IOA 352 is shown as a single function virtual IOA 353 assigned and accessible to SI5 308. Thus, virtual adapter 353 is partitioned to and should be accessed only by system image 308.

Figure 4:
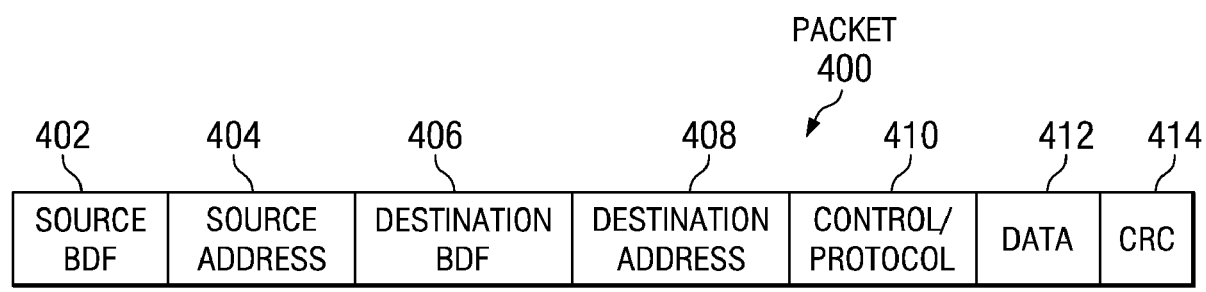
FIG. 4 illustrates a block diagram of the fields that make up a communications packet in accordance with the illustrative embodiment.

FIG. 4 is a block diagram that depicts a communications packet in accordance with the illustrative embodiment. Communications packet 400 preferably conforms to the PCI Express (PCI-E) standard. Packet 400 is used by hosts and I/O adapters to communicate with each other. Packet 400 includes a source BDF field 402 for storing a source BDF number of the sender of the packet, a source address field 404 for storing the address of the sender of the packet, a destination BDF field 406 for storing the destination BDF of the intended recipient of the packet, a destination address field 408 for storing the destination address of the intended recipient of the packet, a control/protocol field 410 for storing control information, a data field 412 for storing data, and a field 414 for storing error correcting bits. The error correcting bits can be a CRC or any other error correcting code.

A packet is routed using the BDF number that is stored in its destination BDF field. The BDF number that is stored in the packet's source BDF field is used when a device responds to this packet.

FIG. 5 is a block diagram of a first BDF translation and protection table, table 357, in accordance with the illustrative embodiment. Table 500 is included only to assist in the description of the illustrative embodiment. Table 500 is not part of the illustrative embodiment.

Table 357 is included within switch 322. Table 357 is used by switch 322 when switch 322 receives and transmits packets. Table 357 includes a source port field 502, a source BDF field 504, a destination BDF field 506, a translation state field 508, a destination port field 510, a translated source BDF field 512, and a translated destination field 514.

When switch 322 receives a packet, switch 322 moves the packet into a mechanism within BDF table 357. The mechanism then uses the source port identity, the source BDF that is found in the packet's source BDF field, and the destination BDF that is found in the packet's destination BDF field to locate one of the rows of BDF table 357. Once the row is located, the mechanism uses the state field to determine whether the source and destination BDF numbers that are currently included in the packet need to be translated. If they do not need to be translated, the packet is simply moved out of BDF table 357 and transmitted using the destination port that was indicated by the located row.

If the row's state field indicates that the source and destination BDF numbers do need to be translated, the mechanism stores the BDF number from the translated source BDF field in the packet's source BDF field. The mechanism also stores the BDF number from the translated destination BDF field in the packet's destination BDF field.

FIG. 6 is a block diagram of a second BDF translation and protection table, table 390, in accordance with the illustrative embodiment. Table 600 is included only to assist in the description of the illustrative embodiment. Table 600 is not part of the illustrative embodiment.

Table 390 is included within switch 327. Table 390 is used by switch 327 when switch 327 receives and transmits packets. Table 390 includes a source port field 602, a source BDF field 604, a destination BDF field 606, a translation state field 608, a destination port field 610, a translated source BDF field 612, and a translated destination field 614.

FIG. 7 is a block diagram of a first BDF translation and protection table, table 392, in accordance with the illustrative embodiment. Table 700 is included only to assist in the description of the illustrative embodiment. Table 700 is not part of the illustrative embodiment.

Table 392 is included within switch 331. Table 392 is used by switch 331 when switch 331 receives and transmits packets. Table 390 includes a source port field 702, a source BDF field 704, a destination BDF field 706, a translation state field 708, a destination port field 710, a translated source BDF field 712, and a translated destination field 714.

As an example, suppose system image 5 308 in host 303 transmits a packet to its function 2 348 in physical I/O adapter 2 345. The host will insert a destination BDF of 0.1.1 into the packet's destination field and insert a source BDF of 0.0.2 into the packet's source field. This source BDF will be used by function 2 348 as a destination BDF when it replies to this packet. This system image has been assigned a source BDF of 0.0.2 by host 303. This packet will be transmitted out from port 384 and into port 333, which is included in switch 331.

Switch 331 then receives this packet and moves it into BDF table 392 (see FIG. 7). The mechanism in BDF table 392 will then use the source port, which was 333, the source BDF read from the packet's source BDF field, which was 0.0.2, and the destination BDF read from the packet's destination field, which was 0.1.1, to locate row 716.

The mechanism will then read the state field 708 for row 716. This field indicates that a translation of BDF numbers must be completed. The mechanism then reads the BDF from translated source BDF field 712 of row 716. This translated source BDF is 2.1.2. The mechanism then stores this translated source BDF into the packet's source BDF field.

The mechanism then reads the BDF from translated destination BDF field 714 of row 716. This translated destination BDF is 6.1.3. The mechanism then stores this translated destination BDF into the packet's destination BDF field.

The packet, which now has a translated source BDF and a translated destination BDF, is transmitted out of the destination port identified by destination port field 710 of row 716. Destination field 710 indicates that the packet should be transmitted out port 359.

Port 359 is connected to port 335. Therefore, the packet is transmitted out port 359 and received by port 335 in switch 322. Switch 322 moves the packet into its BDF table 357 (see FIG. 5). The mechanism in BDF table 357 will then use the source port, which was 335, the source BDF read from the packet's source BDF field, which is 2.1.2, and the destination BDF read from the packet's destination field, which is 6.1.3, to locate row 516.

The mechanism will then read the state field 508 for row 516. This field indicates that the packet should be routed without performing any translation of BDF numbers. The packet, which still has its original source BDF of 2.1.2 and original destination BDF of 6.1.3, is then transmitted out of the destination port that is identified by destination port field 510 of row 516. Destination field 510 indicates that the packet should be transmitted out port 334.

Port 334 is connected to port 358. Therefore, the packet is transmitted out port 334 and received by port 358 in switch 327. Switch 327 receives this packet and moves it into its BDF table 390 (see FIG. 6). The mechanism in BDF table 390 will then use the source port, which was 358, the source BDF read from the packet's source BDF field, which was 2.1.2, and the destination BDF read from the packet's destination field, which was 6.1.3, to locate row 616.

The mechanism will then read the state field 608 for row 616. This field indicates that a translation of BDF numbers must be completed. The mechanism then reads the BDF from translated source BDF field 612 of row 616. This translated source BDF is 2.1.2. The mechanism then stores this translated source BDF into the packet's source BDF field.

The mechanism then reads the BDF from translated destination BDF field 614 of row 616. This translated destination BDF is 0.1.3. The mechanism then stores this translated destination BDF into the packet's destination BDF field.

The packet, which now has a translated source BDF and a translated destination BDF, is transmitted out of the destination port that is identified by destination port field 610 of row 616. Destination field 610 indicates that the packet should be transmitted out port 361.

Port 361 is connected to Physical adapter 2 345. When physical adapter 2 345 receives this packet, it will route the packet to its $3^{rd}$ function, because the BDF number includes a "3" in its function field. Physical adapter's 2 345 $3^{rd}$ function is virtual I/O adapter 348. Virtual I/O adapter 348 was the ultimate intended recipient of this packet.

When virtual adapter 348 responds to this packet, it will generate a new packet and include within that new packet, as the new packet's destination BDF, the source BDF that was provided by the original packet received by virtual adapter 348. The source BDF that was included within the original packet was a BDF of 2.1.2. The new packet will have a destination BDF of 2.1.2.

Virtual adapter 348 will also include its own BDF as the packet's source BDF. Virtual adapter's 348 own BDF is 0.1.3. Therefore, the packet will have a source BDF of 0.1.3.

The packet will then be transmitted from virtual I/O adapter 348 to port 361 in switch 327. The process described above then occurs in reverse as the new packet is transmitted to its ultimate destination which is system image 5 308.

FIG. 8 is a high level flow chart that depicts translating identifiers that are used to route packets between a source device and a destination device in accordance with the illustrative embodiment. The process starts as depicted by block 800 and thereafter passes to block 802 which illustrates the PCI switch receiving a packet from a source device through one of the switch's entry ports. Next, block 804 depicts the PCI switch moving the packet into the routing mechanism in the BDF table that is included in the PCI switch.

The process then passes to block 806 which illustrates the routing mechanism in the BDF table retrieving the value that is stored in the packet's source BDF field and the value that is stored in the packet's destination BDF field. Thereafter, block 808 illustrates the source port number through which this packet entered the switch being provided by switch logic as an input to the mechanism in the BDF table. Next, block 810 depicts the mechanism in the BDF table locating the row in the BDF table that includes the source BDF, the destination BDF, and the source port number.

Thereafter, block 812 illustrates a determination of whether or not the row indicates that translation is necessary. This determination is made by reading the indicator that is stored in located row's translate state field. If a determination is made that the row indicates that a translation is not necessary, the process passes to block 814 which depicts the PCI switch moving the unmodified packet out of the BDF table to the destination port that is identified in the located row. Next, block 816 illustrates the PCI switch transmitting the packet through the destination port that is indicated by the row. The process then terminates as illustrated by block 818.

Referring again to block 812, if a determination is made that the row does indicate that a translation is necessary, the process passes to block 820 which depicts the mechanism in the BDF table retrieving the translated source BDF and the translated destination BDF from the located row. Next, block 822 illustrates the mechanism in the BDF table replacing the source BDF that was retrieved from the packet's source BDF field with the translated source BDF that was retrieved from the located row.

Thereafter, block 824 depicts the mechanism in the BDF table replacing the destination BDF in the packet's destination BDF field with the translated destination BDF that was retrieved from the located row. Block 826, then, illustrates the PCI switch moving this modified packet out of the BDF table to the destination port that is identified in the located row. The process then passes back to block 816.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing environment for translating a set of identifiers that are included in a set of communications packets that are routed between a host and an I/O adapter using a PCI fabric having a set of switches, the method comprising:
   receiving the set of communications packets through a source port, wherein the source port is an edge port or an internal port, wherein the edge port is connected directly to the host or connected directly to the I/O adapter, and wherein the internal port is not directly connected to the host and not directly connected to the I/O adapter;
   locating a state entry in a state field of a routing table that corresponds to a source port entry in a source port field of the routing table;
   determining whether the state entry is a translation value or a routing value;
   when the state entry is a translation value, translating the set of destination identifiers that are included in a first set of communications packets that are received by the edge port of the set of switches before the first set of communications packets are routed out of a destination port based on the entry in a destination port field of the routing table; and
   when the state entry is a routing value, routing a second set of communications packets that are received by the internal port of the set of switches without translating the set of destination identifiers that are included in the second set of communications packets, wherein the second set of communications packets are routed out of the destination port based on the entry in the destination port field of the routing table.

2. The method according to claim 1, further comprising:
   translating a set of source identifiers that are included in the first set of communications packets before routing the first set of communications packets out of the set of switches.

3. The method according to claim 1, further comprising:
   including a routing table in the set of switches; and
   utilizing the routing table to determine whether to translate the set of identifiers that are included in the set of communications packets.

4. The method according to claim 1, further comprising:
   receiving a communications packet from the set of communications packets through a source port in a switch from the set of switches;
   reading a source identifier and a destination identifier included in the communications packet; and
   utilizing the source port, the source identifier and the destination identifier to determine whether to translate the particular destination identifier.

5. The method according to claim 4, further comprising:
   including a routing table in the set of switches;
   utilizing the source port, the source identifier, and the destination identifier to identify a row within the routing table;
   reading the state entry in the state field of the routing table that is included in the row; and
   utilizing the state entry to determine whether to translate the particular destination identifier.

6. The method according to claim 1, further comprising:
   translating the set of identifiers that are included in the set of communications packets that are a set of host-assigned identifiers.

7. The method according to claim 1, further comprising:
   translating the set of destination identifiers that are included in the first set of communications packets by replacing the set of host-assigned identifiers with a set of virtual identifiers.

8. The method according to claim 1, wherein each one of the set of identifiers included in the set of communications packets is a bus/device/function (BDF) number.

9. An apparatus in a data processing environment for translating a set of identifiers that are included in a set of communications packets that are routed between a host and an I/O adapter using a PCI fabric to which a host and a I/O adapter are coupled, the apparatus comprising:
   a bus;
   a storage device connected to the bus, wherein the storage device contains a computer usable program product, and wherein the computer usable program product contains a plurality of instructions; and
   a processor unit connected to the bus, wherein the plurality of instructions causes the processor unit to perform steps comprising:
      receiving the set of communications packets through a source port, wherein the source port is an edge port or an internal port, wherein the edge port is connected directly to the host or connected directly to the I/O adapter, and wherein the internal port is not directly connected to the host and not directly connected to the I/O adapter;
      locating a state entry in a state field of a routing table that corresponds to a source port entry in a source port field of the routing table;

determining whether the state entry is a translation value or a routing value;

when the state entry is a translation value, translating the set of destination identifiers that are included in a first set of communications packets that are received by the edge port of the set of switches before the first set of communications packets are routed out of a destination port based on the entry in a destination port field of the routing table; and when the state entry is a routing value, routing a second set of communications packets that are received by the internal port of the set of switches without translating the set of destination identifiers that are included in the second set of communications packets, wherein the second set of communications packets are routed out of the destination port based on the entry in the destination port field of the routing table.

10. The apparatus according to claim 9, further comprising:

translating a set of source identifiers that are included in a first set of communications packets before routing the first set of communications packets out of the set of switches.

11. The apparatus according to claim 9, further comprising:

including a routing table in the set of switches; and utilizing the routing table to determine whether to translate the set of identifiers that are included in the set of communications packets.

12. The apparatus according to claim 9, further comprising:

receiving a communications packet from the set of communications packets through a source port in a switch from the set of switches;

reading a source identifier and a destination identifier included in the communications packet; and utilizing the source port, the source identifier and the destination identifier to determine whether to translate the particular destination identifier.

13. The apparatus according to claim 12, further comprising:

including a routing table in the set of switches;

utilizing the source port, the source identifier, and the destination identifier to identify a row within the routing table;

reading the state entry in the state field of the routing table that is included in the row; and utilizing the state entry to determine whether to translate the particular destination identifier.

14. The apparatus according to claim 9, further comprising:

translating the set of identifiers that are included in the set of communications packets that are a set of host-assigned identifiers.

15. The apparatus according to claim 9, further comprising:

translating the set of destination identifiers that are included in the first set of communications packets by replacing the set of host-assigned identifiers with a set of virtual identifiers.

16. The apparatus according to claim 9, wherein each one of the set of identifiers included in the set of communications packets is a bus/device/function (BDF) number.

17. A computer program product comprising:

a computer usable medium including a computer usable program code for translating a set of identifiers that are included in a set of communications packets that are routed between a host and an I/O adapter using a PCI fabric to which the host and the I/O adapter are coupled, the computer usable program code causing a computer to perform steps comprising:

receiving the set of communications packets through a source port, wherein the source port is an edge port or an internal port, wherein the edge port is connected directly to the host or connected directly to the I/O adapter, and wherein the internal port is not directly connected to the host and not directly connected to the I/O adapter;

locating a state entry in a state field of a routing table that corresponds to a source port entry in a source port field of the routing table;

determining whether the state entry is a translation value or a routing value;

when the state entry is a translation value, translating the set of destination identifiers that are included in a first set of communications packets that are received by the edge port of the set of switches before the first set of communications packets are routed out of a destination port based on the entry in a destination port field of the routing table; and when the state entry is a routing value, routing a second set of communications packets that are received by the internal port of the set of switches without translating the set of destination identifiers that are included in the second set of communications packets, wherein the second set of communications packets are routed out of the destination port based on the entry in the destination port field of the routing table.

18. The product according to claim 17, further comprising:

translating a set of source identifiers that are included in a first set of communications packets before routing the first set of communications packets out of the set of switches.

19. The product according to claim 17, further comprising:

including a routing table in the set of switches; and utilizing the routing table to determine whether to translate the set of identifiers that are included in the set of communications packets.

20. The product according to claim 17, further comprising:

receiving a communications packet from the set of communications packets through a source port in a switch from the set of switches;

reading a source identifier and a destination identifier included in the communications packet; and utilizing the source port, the source identifier and the destination identifier to determine whether to translate the particular destination identifier.

* * * * *